United States Patent [19]

Hernandez et al.

[11] Patent Number: 5,413,833
[45] Date of Patent: May 9, 1995

[54] INJECTION MOLDED PLASTIC BOSS DESIGN

[75] Inventors: Gilberto Hernandez; Erica J. Scholder, both of Austin; Doug Thompson, Round Rock, all of Tex.

[73] Assignee: Dell USA, L.P., Austin, Tex.

[21] Appl. No.: 247,385

[22] Filed: May 23, 1994

[51] Int. Cl.⁶ .............................................. B32B 3/30
[52] U.S. Cl. .................................... 428/119; 428/120
[58] Field of Search .............................. 428/119, 120

*Primary Examiner*—Alexander S. Thomas
*Attorney, Agent, or Firm*—J. Richard Konneker; James Huffman

[57] ABSTRACT

A webbed boss is integrally formed on and projects outwardly from the nominal surface of a wall portion of an injection molded plastic part and has a specially designed cross-section along its length that increases the strength of the boss, in both bending and twisting modes, without increasing the tendency of creating a sink mark on the cosmetic side surface of the wall portion beneath the boss. Representatively, along its length the boss has a generally cross-shaped cross section defined by four webs that meet, at inner cross-sectional ends thereof, at a square junction area of the boss. Each boss has an outer side edge portion with a thickness at the nominal wall side surface of about 60% of the wall portion thickness. From such outer side edge portion, the opposite sides of each of the bosses taper inwardly to the junction area in a manner such that the maximum thickness of the junction area parallel to the nominal side surface is about 60% of the wall portion thickness.

13 Claims, 4 Drawing Sheets

INJECTION MOLDED PLASTIC BOSS DESIGN

BACKGROUND OF THE INVENTION

The present invention generally relates to the formation of injection molded plastic structures, and more particularly relates to an improved cross-sectional configuration of a boss that is formed integrally with and projects outwardly from a side of a plate-shaped portion of an injection plastic molding.

One of the most difficult tasks encountered in the design of an injection molded plastic part is maintaining the integrity of cosmetic surface portions of the part while at the same integrally incorporating in the part structural portions that make the part functional. For example, on the flat, generally plate-shaped wall portions of many injection molded plastic parts there is an outer or cosmetic side surface that the user/consumer sees, and an inner or nominal side surface upon which protruding structural portions of the part, such as snaps, bosses, ribs and the like are formed. Each of these structural portions of the overall injection molded plastic part interrupts the flow of the plastic as it moves into the mold, and cause undesirable dimpling or "sinking" of the cosmetic side surface portion underlying the structural part if the shape of the structural protrusion is not carefully designed.

Webbed bosses are one of the most common structural protrusions formed on the nominal surface of a plate-shaped wall portion of an injection molded plastic part, and serve as locating features for parts to be mounted to the molded structure such as guide ribs, spacers, structural reinforcing members and the like. Preventing cosmetic side surface sink marks behind webbed bosses has always presented challenges to designers of injection molded plastic parts.

A general design rule of thumb in the formation of a protrusion on the nominal surface of a flat wall portion of an injection molded part is that to prevent cosmetic side surface sink behind the protrusion the maximum thickness of the protrusion at and parallel to the nominal surface should be no greater than about 60% of the wall thickness. In the case of a single rib formed on the nominal side surface, the cross-sectional thickness of the rib at the nominal surface can simply be made about 60% of the wall thickness to maximize rib strength without tending to create undesirable cosmetic side surface sink behind the rib.

However, when a multi-webbed boss of a conventional rectangularly cross-sectioned web configuration is to be formed on the nominal side surface of the molding wall portion, the cross-sectional thicknesses of the webs at the nominal side surface must be considerably less than 60% of the wall thickness to prevent cosmetic side surface sinking. This design limitation undesirably diminishes the strength of the webbed boss in both bending and torsional twisting modes. In view of this limitation it is seen to be desirable to provide an improved injection molded webbed boss design that increases the strength of the boss without increasing its tendency to cause cosmetic side surface sink beneath the boss. It is accordingly an object of the present invention to provide such an improved webbed injection molded plastic boss design.

SUMMARY OF THE INVENTION

In carrying out principles of the present invention, in accordance with a preferred embodiment thereof, an injection molded plastic part is provided that comprises a wall portion having a thickness T and opposite first and second sides, and a webbed boss formed on and longitudinally projecting outwardly from the second side of the wall portion. The boss is provided with a special configuration that, compared to webbed bosses having conventional shapes, increases the strength of the boss without creating an undesirable boss-related sink area on the first side of the wall portion beneath the boss.

The specially configured boss of the present invention has, along its length, a cross-section defined by a plurality of webs joined at and laterally extending outwardly from a junction area. Each of the webs has an outer side edge portion spaced laterally apart from the junction area, and a pair of opposite side portions that convergently extend from the outer side edge portion laterally to the junction area.

These tapered lateral web sections that interconnect the web outer side edge portions to and converge toward the junction area permit the boss to be configured, in accordance with a preferred embodiment of the boss illustrated and described herein, in a manner such that the outer web side edge portions have, at the second wall portion side, thicknesses equal to about 0.6T, and the junction area has, at the second wall portion side, a maximum thickness of about 0.6 T. The unique ability to have both of these thicknesses at about 0.6 T substantially increases both the bending and torsional strength of the boss without causing its formation on the wall portion to create a sink mark on the first or cosmetic side of the wall portion.

BRIEF DESCRIPTION OF THE DRAWINGS

in FIG. 5, and perspectively illustrates the specially configured boss.

DETAILED DESCRIPTION

Figure 1:
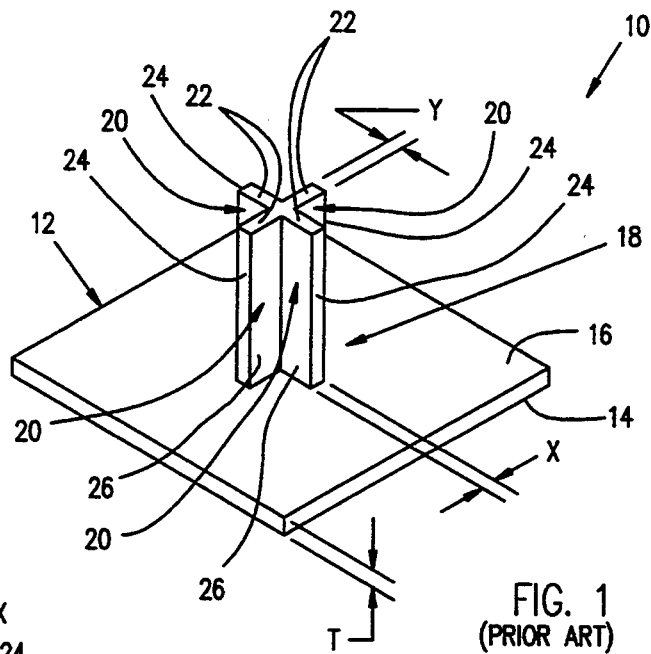
FIG. 1 (PRIOR ART) is a simplified perspective view of a representative injection molded plastic part having a plate-shaped base portion from a side of which a conventionally cross-sectioned webbed boss outwardly projects.
Figure 2:
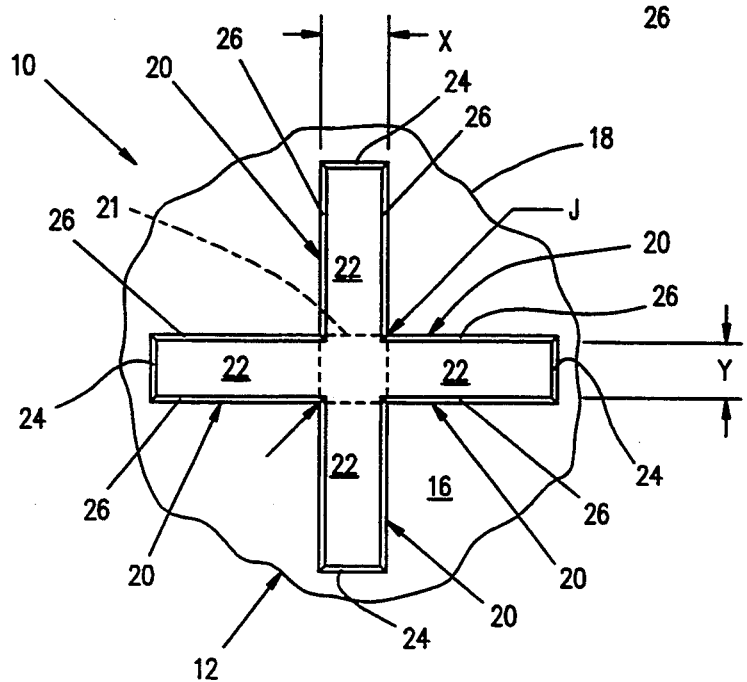
FIG. 2 (PRIOR ART) is an enlarged outer end elevational view of the conventionally configured boss.

Perspectively illustrated in FIG. 1 (PRIOR ART) is a representative injection plastic molded part 10 that comprises a plate-shaped base wall portion 12 having a thickness T, a lower or cosmetic side surface 14 which will typically be visible to a user of the part, and an upper or nominal side surface 16, and a boss 18 molded integrally with the wall portion 12 and longitudinally projecting upwardly from its inner side 16. As also shown in FIG. 2 (PRIOR ART), the boss 18 has a generally cross-shaped cross section along its length formed by four vertically elongated web portions 20 that meet at inner sides thereof at the generally rectangular dotted line junction area 21 of the boss 18 shown in FIG. 2 and laterally project outwardly from the junction area 21.

Each of the webs 20 has an outer end 22, an outer side edge 24, and a pair of opposite sides 26. As is conventional in the plastic injection molding process, each of the webs 20 is upwardly and inwardly tapered along its opposite sides 26, and its outer side edge 24 slopes upwardly and toward the juncture area 21, to provide the boss 18 with the requisite "draft" to facilitate its removal from the mold. Cross-sectionally along the length of the boss 18, each of the webs 20 has a rectangular configuration, with the horizontal thickness of each web at its outer side edge 24 being essentially identical to its horizontal thickness at the juncture area 21.

Figure 3:
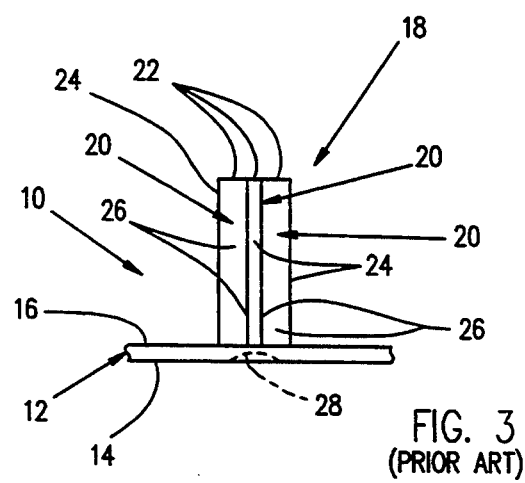
FIG. 3 (PRIOR ART) is a vertical side elevational view of the conventionally configured boss and illustrates in phantom a sunken area on the cosmetic side of the molding base portion that can be created by the formation of the boss.
Figure 4:
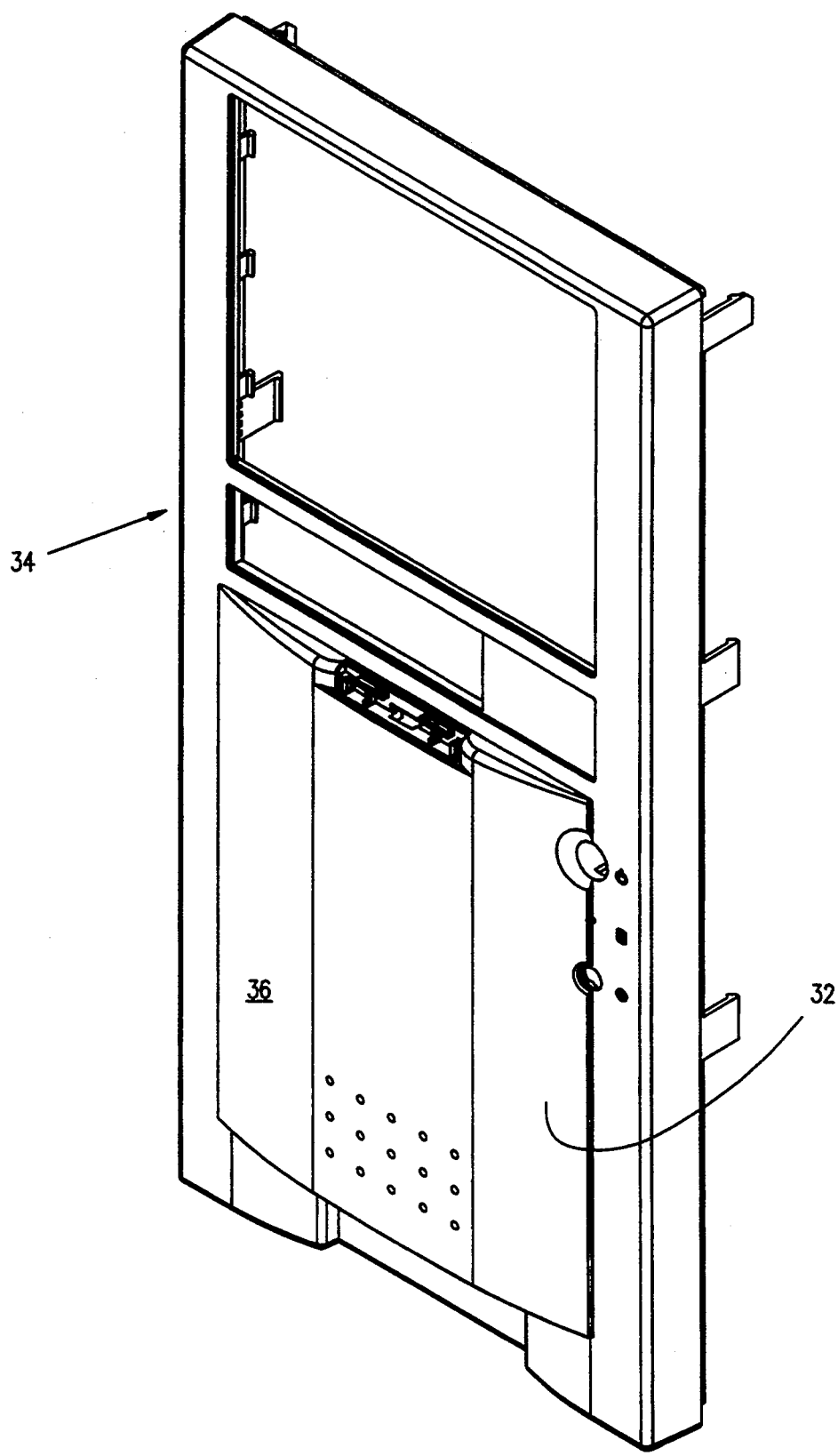
FIG. 4 is an outer or cosmetic side perspective view of an injected molded plastic computer housing portion embodying principles of the present invention.
Figure 5:
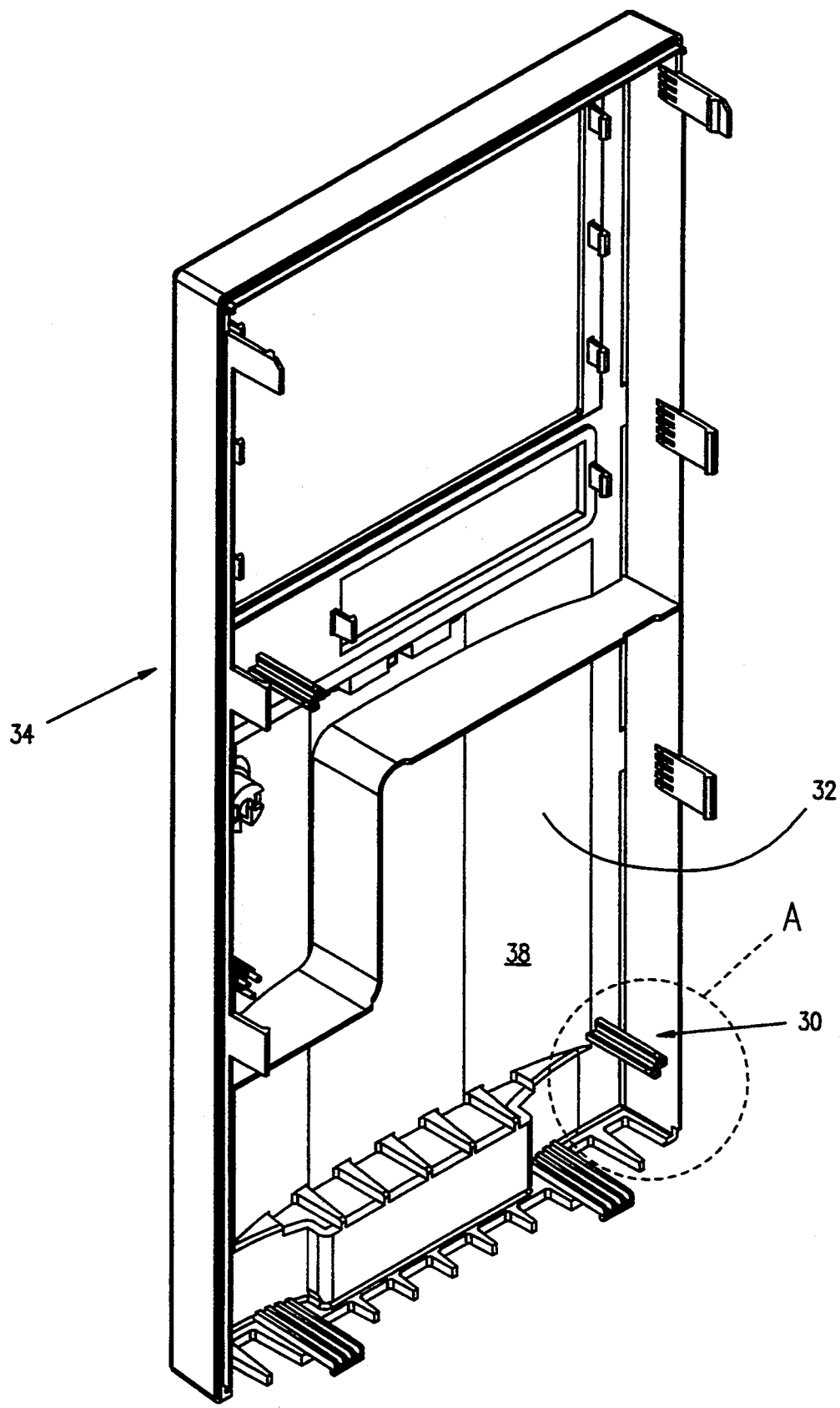
FIG. 5 is an inner side perspective view of the computer housing portion and illustrates a specially configured boss that embodies principles of the present invention and projects inwardly from the inner side of the computer housing portion.
Figure 6:
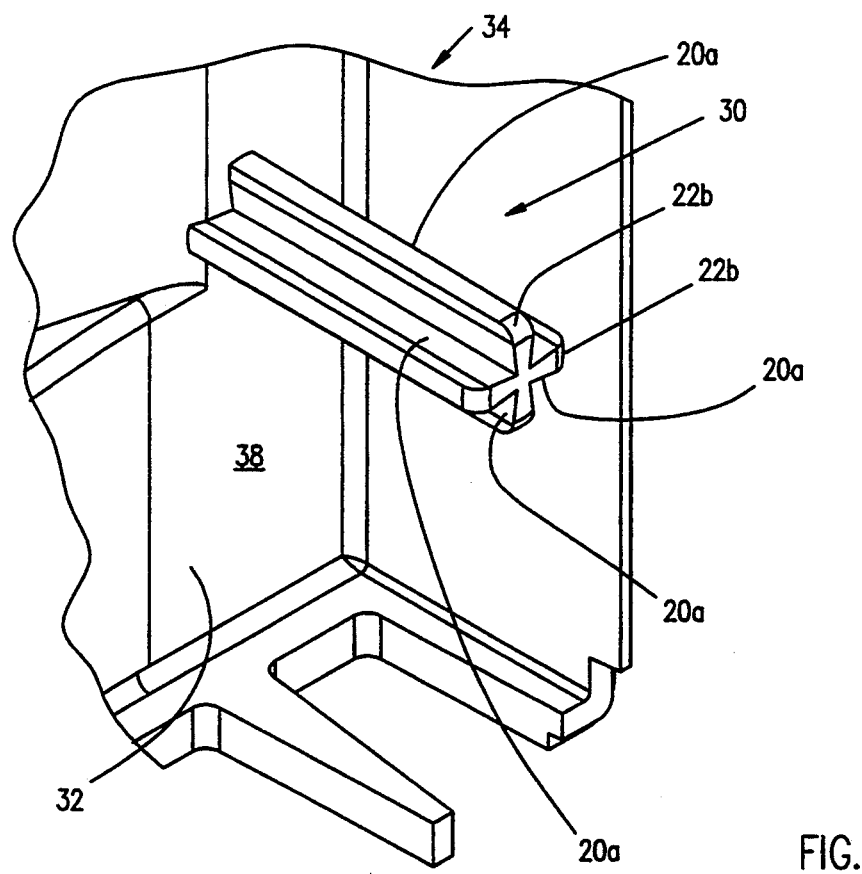
FIG. 6 is an enlarged scale detail view of the circled area "A"
Figure 7:
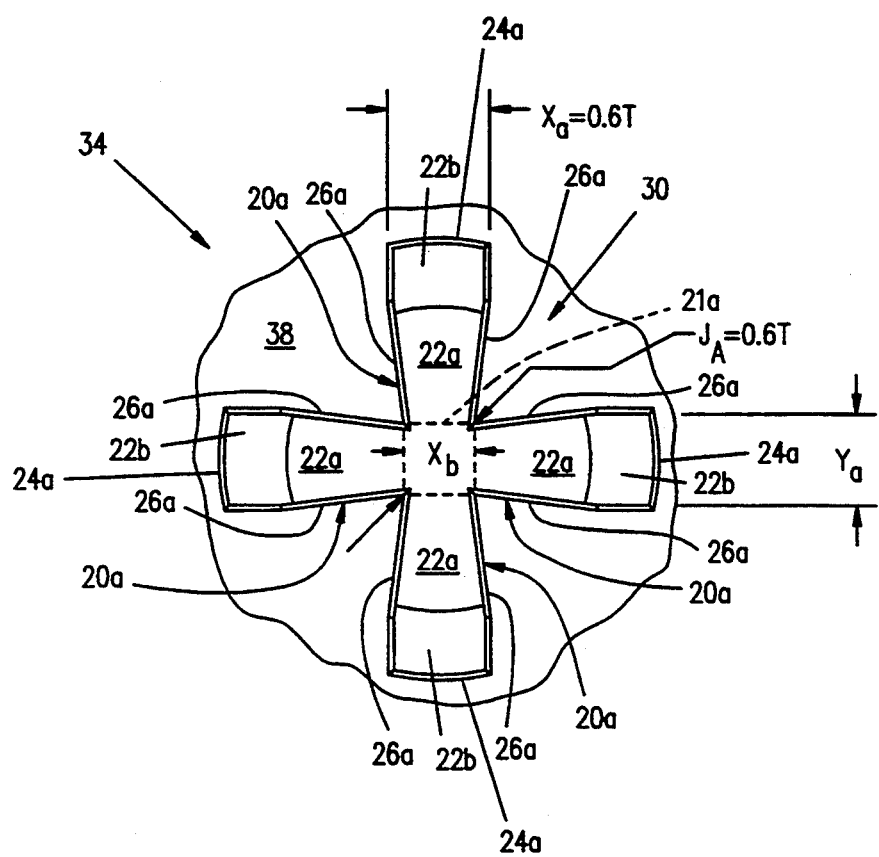
FIG. 7 is an enlarged scale outer end elevational view of the boss shown in FIG. 6.

It is well known in the plastic injection molding art that if the shape of the boss 18 at its juncture with the inner side wall 16 of the base wall portion 12 is not properly configured an undesirable dimple or "sink mark" 28 will be formed in the cosmetic surface 14 beneath the inner end of the boss 18 during the molding process as shown in phantom in FIG. 3 (PRIOR ART). The general design rule that is traditionally followed to avoid this sink mark problem is that the width of any protrusion from the nominal surface should be no more than 60% of the thickness of the molding portion from which the protrusion outwardly extends. Additionally, to permit sufficient ejector pin contact area at the outer end of the protrusion, its minimum thickness is typically 0.040 inches.

Applying this design criteria to each of the boss webs 20, the maximum thickness X of each of the webs 20 at the nominal surface 16 (see FIG. 2) would be 0.6 T (where T is the thickness of the base portion 12) if the web was to be formed by itself on the base portion nominal surface 16, and the minimum thickness Y at the outer end of the web would be 0.040 inches.

However, in the generally cross-shaped cross sectional configuration of the illustrated boss 18, making the thickness dimension X equal to 0.6 T would result in the maximum protrusion thickness J at the base of the junction area 21 (i.e., the diagonal of the square junction area 21) being substantially larger than 0.6 T—namely, about 0.85 T. Thus, the maximum protrusion thickness at the nominal surface 16 would be more than 40% greater than the maximum protrusion thickness allowable to avoid the formation of a sink mark 28 as shown in FIG. 3.

To avoid this problem it is necessary to hold the junction area thickness J at the base of the boss 18 to the maximum 0.6 T dimension, thereby correspondingly reducing the maximum web thickness dimension X to about 0.42 T—an available web thickness reduction of about 30%. As can readily be seen, this necessity of holding the web thickness well below the 0.6 T maximum protrusion thickness value substantially lessens the strength of the boss 18 compared to its strength with a web thickness of 0.6 T. Additionally, the maximum length of the boss 18 is also substantially lessened since, with a given draft slope along the length of the boss, the web thickness Y will reach its minimum 0.040 inch dimension sooner than if the base web thickness X was 0.6 T.

Referring now to FIGS. 4–7, the present invention provides a specially configured boss 30 representatively formed on a wall 32 of an injection molded plastic outer housing portion 34 of a computer tower unit. The wall 32 has an outer or cosmetic side surface 36, and an inner or nominal side surface 38 from which the boss 30 outwardly projects. For purposes of comparing the specially configured boss 30 to the conventionally configured boss 18 shown in FIGS. 1-3, it will be assumed that the thickness of the wall 32 at the location of the boss 30 is equal to the thickness T of the base wall portion 12 of the molded plastic part 10 shown in FIG. 1.

Like the previously described boss 18, the boss 30 of the present invention has a generally cross-shaped configuration along its length defined by four web portions 20a that meet at a square junction area 21a (shown in phantom in FIG. 7) and laterally project outwardly from the junction area. Each of the webs 20a has an outer end 22a, an outer side edge 24a, and a pair of opposite sides 26a. To assist in withdrawing the boss 30 from the injection mold, top outer corner portions of the webs 20a are rounded as at 22b.

According to a key advantage of the boss 30 over the conventionally configured boss 18, the outer side edge thickness Xa of each web 20a, at the web's juncture with the nominal surface 38 of the wall 32, is shown as being 60% of the thickness T of the wall 32 (although it could be narrower if desired). Despite the maximization of its outer web side edge dimension, however, the formation of the boss 30 on the nominal wall surface 38 does not tend to form a sink mark on the cosmetic wall surface 36.

This desirable advantage of the boss 30 over the conventionally configured boss 18 arises from a unique laterally inward sloping of the opposite sides 26a of each web 20a inwardly toward the junction area 21 from an outer side edge portion of the web in a manner such that the maximum protrusion thickness Ja of the junction area 2a (i.e., its diagonal dimension) is a maximum of 0.6 T. This dimension could be less if desired. In the illustrated, generally optimized configuration of the cross-sectionally cross-shaped boss 30, the degree of lateral tapering of the opposite sides 26a of each of the boss webs 20a is such that the horizontal thickness Xb of each web 20a at the junction area 21a is about 0.71 Xa or about 0.42 T.

By comparing the bosses 30 and 18 it can be readily be seen that the outer web side edge thickness Xa of the boss 30 may be considerably greater than the corresponding outer web side edge thickness X of the boss 18 when each boss is configured to avoid cosmetic surface sink marks attributable to their formation. Accordingly, given equal cross-sectional web lengths in each of the two bosses, the boss 30 with its laterally tapered webs is considerably stronger in both lateral bending and axial twisting modes than the conventionally configured boss 18. Moreover, since the dimension Xa of the boss 30 is greater than the corresponding dimension X of the boss

18, the length of the boss 30 may be made longer than the boss 18 before the 0.040 inch limitation for dimension Ya is reached for the boss 30.

The overall cross-sectional shape of the boss 30 of the present invention is not at all complicated from a manufacturing standpoint. There is adequate space for ejector pins on the top of the boss, and the shape of the boss 30 is simple for the moldmaker to cut into the mold tool material, a factor tending to substantially reduce tooling cost and lead times.

Although the webbed boss 30 has been representatively illustrated as having a cross-shaped configuration along its length, it will be readily appreciated by those skilled in the plastic forming art that the principles of the present invention could also be utilized in webbed bosses having other cross-sectional configurations including but not limited to X-shaped cross sections, T-shaped cross sections, L-shaped cross sections, and V-shaped cross sections.

The foregoing detailed description is to be clearly understood as being given by way of illustration and example only, the spirit and scope of the present invention being limited solely by the appended claims.

What is claimed is:

1. An injection molded plastic part comprising:
   a wall portion having opposite first and second sides; and
   a boss formed on and longitudinally projecting outwardly from said second side of said wall portion, said boss having, along its length, a cross-section defined by a plurality of webs joined at and laterally extending outwardly from a junction area, each of said webs having an outer side edge portion spaced laterally apart from said junction area, and a pair of opposite side portions that convergently extend from said outer side edge portion laterally to said junction area.

2. The injection molded plastic part of claim 1 wherein:
   said injection molded plastic part is a portion of a computer housing.

3. The injection molded plastic part of claim 1 wherein:
   said wall portion has a thickness T at said boss,
   said outer side edge portions of said webs have thicknesses at said wall portion of about 0.6 T, and
   said junction area has a maximum thickness not appreciably greater than about 0.6 T at said wall portion.

4. The injection molded plastic part of claim 3 wherein:
   said junction area has a maximum thickness at said wall portion of about 0.6 T.

5. The injection molded plastic part of claim 1 wherein:
   said boss has a generally cross-shaped cross section along its length.

6. The injection molded plastic part of claim 1 wherein:
   said junction area has a generally square cross-section along its length.

7. The injection molded plastic part of claim 1 wherein:
   said webs have beveled outer end corners.

8. An injection molded plastic part comprising:
   a generally plate-like wall portion having a thickness T, a cosmetic side surface and a nominal side surface; and
   a boss formed on and longitudinally projecting transversely outwardly from said nominal side of said wall portion, said boss being configured to inhibit the formation of a cosmetic side surface sink mark beneath said boss during the molding of said part and having:
   a laterally central junction portion, and
   a circumferentially spaced plurality of webs laterally projecting outwardly from said junction portion and longitudinally extending along the length of said boss, each of said webs having a laterally outer side edge portion with a generally rectangular cross-section along its length, and a laterally inner portion connecting said laterally outer side edge portion to said junction portion, said laterally inner portion having a generally trapezoidal cross-section along its length and laterally tapering inwardly toward said junction area.

9. The injection molded plastic part of claim 8 wherein:
   said injection molded plastic part is a portion of a computer housing.

10. The injection molded plastic part of claim 8 wherein:
    each of said laterally outer side edge portions of said webs has a thickness at said nominal side surface of said wall portion of about 0.6 T, and
    said junction portion has a maximum thickness, at said nominal side surface of said wall portion, of not appreciably greater than 0.6 T.

11. The injection molded plastic part of claim 10 wherein:
    said junction portion has a maximum thickness, at said nominal side surface of said wall portion, of about 0.6 T.

12. The injection molded plastic part of claim 8 wherein:
    said boss has a generally cross-shaped cross section along its length.

13. The injection molded plastic part of claim 8 wherein:
    said junction portion has a generally square cross-section along its length.

* * * * *